(12) United States Patent
Jaeger

(10) Patent No.: US 10,953,782 B2
(45) Date of Patent: Mar. 23, 2021

(54) DIRECTIONAL VEHICLE RECOVERY UNIT

(71) Applicant: Lori Lynn Smith, Oregon, OH (US)

(72) Inventor: David A. Jaeger, Oregon, OH (US)

( * ) Notice: Subject to any disclaimer, the term of this patent is extended or adjusted under 35 U.S.C. 154(b) by 340 days.

(21) Appl. No.: 15/336,065

(22) Filed: Oct. 27, 2016

(65) Prior Publication Data

US 2018/0118081 A1    May 3, 2018

(51) Int. Cl.
*B60P 3/12* (2006.01)
*B66C 23/44* (2006.01)

(52) U.S. Cl.
CPC .............. *B60P 3/12* (2013.01); *B66C 23/44* (2013.01)

(58) Field of Classification Search
CPC ................................ B60P 3/125; B66C 23/44
See application file for complete search history.

(56) References Cited

U.S. PATENT DOCUMENTS

| | | | |
|---|---|---|---|
| 6,443,685 B1 | 9/2002 | Maeno | |
| 6,543,749 B1 | 4/2003 | Duvall | |
| 7,950,892 B2 | 5/2011 | Ceccarelli et al. | |
| 8,192,135 B2 | 6/2012 | Ceccarelli et al. | |
| 8,215,892 B2 * | 7/2012 | Calliari | B60P 1/6463 |
| | | | 414/469 |
| 8,360,706 B2 | 1/2013 | Addleman et al. | |
| 8,540,475 B2 | 9/2013 | Kuriakose et al. | |
| 2009/0263222 A1 | 10/2009 | Kuriakose et al. | |
| 2010/0295005 A1 * | 11/2010 | Riggs | B66C 23/44 |
| | | | 254/326 |
| 2012/0308353 A1 | 12/2012 | Roberts | |
| 2014/0252285 A1 * | 9/2014 | Genoe | B66C 23/44 |
| | | | 254/280 |
| 2015/0360920 A1 * | 12/2015 | Frazier | B66C 23/44 |
| | | | 414/744.3 |

* cited by examiner

*Primary Examiner* — Saul Rodriguez
*Assistant Examiner* — Ashley K Romano
(74) *Attorney, Agent, or Firm* — Charles F. Charpie, III

(57) ABSTRACT

A directional vehicle recovery unit configured for recovery of a distressed vehicle spaced apart from a recovery vehicle is provided. The directional vehicle recovery unit includes a support framework attached to the recovery vehicle and a swing arm assembly attached to the support framework. The swing arm assembly is configured to support a winch cable. The swing arm assembly is rotatable such that with a winch cable attached to the distressed vehicle, a longitudinal axis of the swing arm assembly is substantially parallel with an axis formed by the winch cable.

18 Claims, 5 Drawing Sheets

DIRECTIONAL VEHICLE RECOVERY UNIT

BACKGROUND

Tow trucks (also called a wrecker, a breakdown truck, recovery vehicle or a breakdown lorry) are trucks used to move disabled, improperly parked, impounded, indisposed or otherwise distressed motor vehicles. This may involve recovering a vehicle damaged in an accident, returning the vehicle to a drivable surface or towing or transporting the vehicle to a repair shop or other location.

Recovery vehicles, such as tow trucks can be equipped with different equipment and configured for different tasks. One example of a recovery vehicle is a "hook and chain" tow truck (also called a "sling truck"). In this embodiment, one or more hooks and chains can be used to tow the cargo. That is, they work by wrapping chains around axles and frames of distressed vehicles to facilitate towing. Another example of a recovery vehicle is a wheel lift tow truck. These tow trucks are similar to the hook and chain tow trucks, but cause much less damage as instead of using chains, they use a metal yoke which under the front or rear wheels of the distressed vehicle. As the distressed vehicle is towed, a pneumonic hoist or hydraulic lift suspends the front or rear side of the distressed vehicle such that it is lifted from the ground. This reduces potential damage to the distressed vehicle.

Yet another example of a recovery vehicle is a flatbed tow truck (also called a "rollback" or a "slide"). The flatbed tow truck typically includes a self-propelled truck chassis equipped with a vehicle carrier bed. The vehicle carrier bed is typically supported for movement from a horizontal position on the truck chassis first to a slideback position and then to a tilted position. In the tilted position, the vehicle carrier bed has a rear portion in a ground engaging position for loading or unloading of a distressed vehicle onto or from the tilted bed, either by the distressed vehicle's own power or by a cable winch positioned at the front end of the bed.

Regardless of the type of recovery vehicle, typically a first task is to pull a distressed vehicle to an area adjacent to the recovery vehicle such that the distressed vehicle can be connected to the recovery vehicle for the towing operation. If the distressed vehicle is positioned off of a road, the recovery vehicle can be oriented to potentially block one or more lanes of traffic.

It would be advantageous if recovery vehicles could be improved to make them convenient to use.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the directional vehicle recovery unit.

The above objects as well as other objects not specifically enumerated are achieved by a directional vehicle recovery unit configured for recovery of a distressed vehicle spaced apart from a recovery vehicle. The directional vehicle recovery unit includes a support framework attached to the recovery vehicle and a swing arm assembly attached to the support framework. The swing arm assembly is configured to support a winch cable. The swing arm assembly is rotatable such that with a winch cable attached to the distressed vehicle, a longitudinal axis of the swing arm assembly is substantially parallel with an axis formed by the winch cable.

There is also provided a method of using a directional vehicle recovery unit for recovery of a distressed vehicle spaced apart from a recovery vehicle. The method includes the steps of extending a winch cable from a swing arm assembly to the distressed vehicle, the swing arm assembly being attached to the recovery vehicle, rotating the swing arm assembly such that a longitudinal axis of the swing arm assembly is substantially parallel with an axis formed by the winch cable and pulling the distressed vehicle in a direction toward the recovery vehicle.

Various objects and advantages of the directional vehicle recovery unit will become apparent to those skilled in the art from the following detailed description, when read in light of the accompanying drawings.

DETAILED DESCRIPTION OF THE INVENTION

Figure 1:
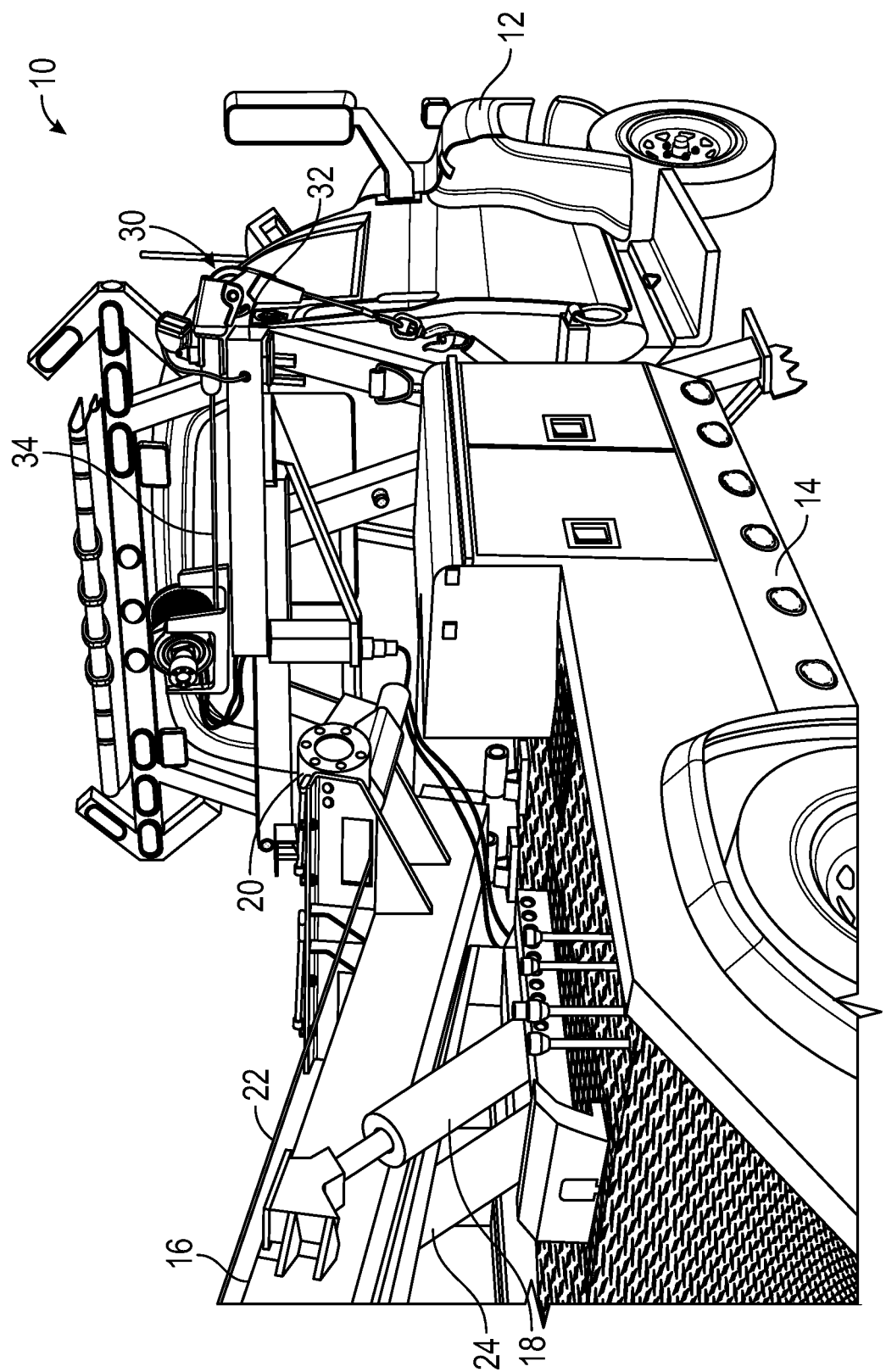
FIG. 1 is a perspective view of a first embodiment of a recovery vehicle fitted with a directional vehicle recovery unit.

The directional vehicle recovery unit will now be described with occasional reference to specific embodiments. The directional vehicle recovery unit may, however, be embodied in different forms and should not be construed as limited to the embodiments set forth herein. Rather, these embodiments are provided so that this disclosure will be thorough and complete, and will fully convey the scope of the directional vehicle recovery unit to those skilled in the art.

Unless otherwise defined, all technical and scientific terms used herein have the same meaning as commonly understood by one of ordinary skill in the art to which the directional vehicle recovery unit belongs. The terminology used in the description of the directional vehicle recovery unit is for describing particular embodiments only and is not intended to be limiting of the directional vehicle recovery unit. As used in the description of the directional vehicle recovery unit and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the directional vehicle recovery unit. Notwithstanding that the numerical ranges and parameters setting forth the broad scope of the directional vehicle recovery unit are approximations, the numerical values set forth in the specific examples are reported as precisely as possible. Any numerical values, however, inherently contain certain errors necessarily resulting from error found in their respective measurements.

The description and figures disclose a directional vehicle recovery unit. Generally, the directional vehicle recovery unit is fitted to a recovery vehicle and includes a rotatable swing arm assembly. A winch is supported by the rotatable swing arm assembly such as to permit a winch cable extending from the winch to attach to a distressed vehicle. The distressed vehicle can be positioned in an area either to a side of the recovery vehicle or in an area off of a rear portion of the recovery vehicle. Since the swing arm assembly is rotatable, the swing arm assembly can be positioned at any desired angle relative to the longitudinal axis of the recovery vehicle, thereby allowing a longitudinal axis of swing arm assembly to align with an axis formed by the winch cable. In this manner, the rotatable swing arm assembly supports the winch cable along its axis, regardless of the angle formed by the swing arm assembly relative to the longitudinal axis of the recovery vehicle.

The term "recovery vehicle", as used herein, is defined to mean any vehicle configured to recover an object load. Non-limiting examples of recovery vehicles include all forms of tow trucks. The term "recover", as used herein, is defined to mean the movement of an object from one location to another. The term "distressed vehicle", as used herein, is defined to mean any vehicle requiring assistance for movement.

Referring now to FIG. 1, a first embodiment of a recovery vehicle is shown generally at 10. The recovery vehicle includes a cab 12, a chassis 14, a boom 16, a boom support assembly 18, a winch 20 and one or more winch cables 22. The cab 12 is an enclosed space typically housing a seated driver (not shown) and an engine (not shown). The cab 12 can include one or more doors and can have one or more seating areas.

Referring again to FIG. 1, the chassis 14 typically includes a frame (not shown) configured to support front and rear axles, front and rear wheels, the boom 16 and the boom support assembly 18. Typically, the frame is formed from structural metallic components, such as for example, square tubing, angles, channels and the like. However, the frame can be formed from other materials and components.

Referring again to FIG. 1, the boom 16 is an adjustable support member configured to support the winch cable 22 as the winch cable 22 is used to recover distressed vehicles. In the illustrated embodiment, one end of the boom 16 pivots about a pivot point fixed adjacent to the chassis 14, thereby allowing the opposite end of the boom 16 to raise and lower as needed. However, in other embodiments, the boom 16 can be fixed at desired angles.

Referring again to FIG. 1, the boom support assembly 18 includes one or more hydraulically telescoping tubes 24 attached to the boom 16 and configured to raise and lower the boom 16. It should be appreciated that in other embodiments, the boom 16 can be raised and lowered by other suitable structures, mechanisms and devices.

Referring again to FIG. 1, the winch 20 is a mechanical device used to pull in (wind up) or let out (wind out) or otherwise adjust the "tension" of the winch cable 22. In the illustrated embodiment, the winch 20 includes a spool (also called a winch drum) attached to a driver. The driver is configured to rotate the spool and can be powered by electric, hydraulic, pneumatic or internal combustion devices. In certain embodiments, the winch 20 may include a brake mechanism configured to prevent the spool from rotating.

Referring again to FIG. 1, the winch cable 22 extends from the winch 20 and is supported by the boom 16. The winch cable 22 is configured for attachment to the distressed vehicle and is further configured to urge the distressed vehicle in a direction toward the recovery vehicle 10 as the winch cable 22 is wound around the spool. In the illustrated embodiment, the winch cable 22 has the form of a wire rope. However, in other embodiments, the winch cable can have other forms, including the non-limiting example of a flat cable sufficient to attach to the distressed vehicle and urge the distressed vehicle in a direction toward the recovery vehicle 10.

Referring again to FIG. 1, the recovery vehicle 10 has been fitted with a directional vehicle recovery unit 30 (hereafter "recovery unit"). Generally, the recovery unit 30 includes a rotatable swing arm assembly 32 supported by a support framework 36. The rotatable swing arm assembly 32 is configured to rotate in a direction toward the distressed vehicle (not shown). With the swing arm assembly 32 pointed in a direction toward the distressed vehicle, the swing arm assembly 32 is configured to support a winch cable 34 attached to the distressed vehicle. While the recovery vehicle 10 illustrated in FIG. 1 has the form of a tow truck configured to "tow" the distressed vehicle, it should be appreciated that other forms of recovery vehicles can be fitted with the recovery unit 30, such as for example, the flatbed style of tow truck illustrated in FIG. 2.

Figure 2:
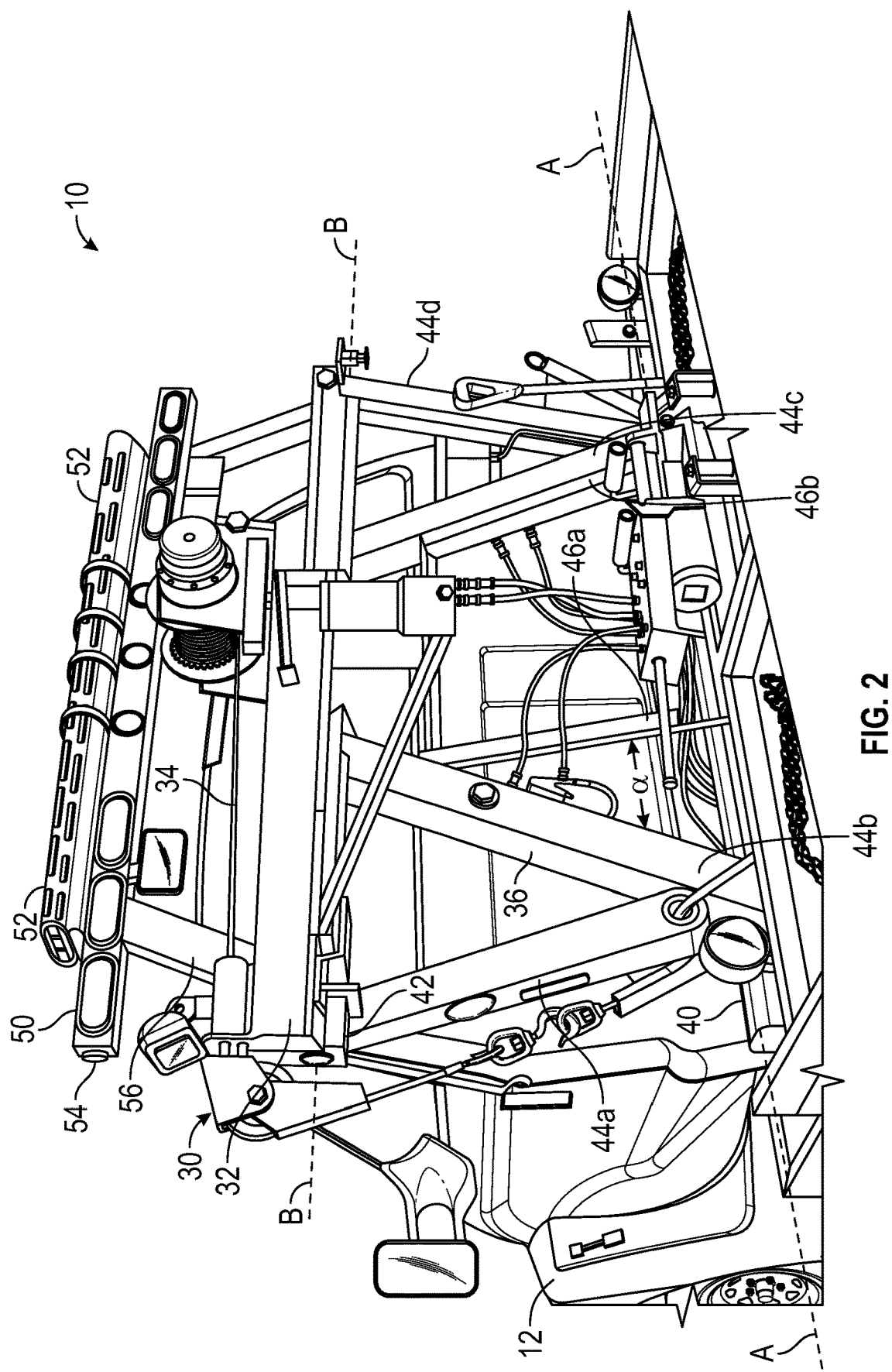
FIG. 2 is a perspective view of a second embodiment of a recovery vehicle fitted with a directional vehicle recovery unit.

Referring now to FIG. 2, the recovery vehicle 10 fitted with the rotatable swing arm assembly 32 is illustrated. The rotatable swing arm assembly 32 is attached to the support framework 36. The support framework 36 is attached to, and supported by, the recovery vehicle chassis 14. The support structure 36 is configured to rigidly support the recovery unit 30 during operations to secure a distressed vehicle. That is, the support framework 36 is configured to support the tensional and torsional forces that may develop as the winch cable 34 pulls the distressed vehicle in a direction toward the recovery vehicle 10.

Referring again to the embodiment illustrated in FIG. 2, the support framework 36 includes a lower member 40 spaced apart from an upper member 42 by a plurality of intermediate members 44a-44d. The lower member 40 is configured for attachment to the chassis 14 and further configured to support the rotatable swing arm assembly 32 and the remaining portions of the support framework 36. The lower member is attached to the chassis 14 with mechanical fasteners, such as for example, nuts and bolts. However, in other embodiments, the lower member 40 can be attached to the chassis 14 by other structures, mechanisms and devices, such as for example, clips, clamps or by welding. In the illustrated embodiment, the lower member 40 is formed from 4.5 inch square steel tube having an 11 gauge wall thickness. Alternatively, the lower member 40 can be formed from other materials or combinations of materials sufficient for attachment to the chassis 14 and sufficient to support the rotatable swing arm assembly 32 and the remaining portions of the support framework 36.

The upper member 42 is configured for attachment to the intermediate members 44a-44d and further configured to support the rotatable swing arm assembly 32. In the illustrated embodiment, the upper member 42 is attached to the intermediate members 44a-44d by welding. However, in other embodiments, the upper member 42 can be attached to the intermediate members 44a-44d by other structures, mechanisms and devices, such as for example, mechanical fasteners, clips or clamps. In the illustrated embodiment, the upper member 42 is formed from 4.5 inch square steel tube having an 11 gauge wall thickness. Alternatively, the upper member 42 can be formed from other materials or combinations of materials sufficient for attachment to the intermediate members 44a-44d and sufficient to support the rotatable swing arm assembly 32.

Referring again to FIG. 2, the lower member 40 is centered about an axis A-A and the upper member 42 is centered about an axis B-B. In the illustrated embodiment, the axes A-A and B-B are substantially parallel with each other. Without being held to the theory, it is believed the parallel orientation of the axes A-A and B-B provides sufficient rigidity to the support framework 36 such that the support framework 36 can support the tensional and torsional forces that may develop as the winch cable 34 pulls the distressed vehicle in a direction toward the recovery vehicle 10. However, in other embodiments, the axes A-A and B-B can have non-parallel orientations sufficient to support the tensional and torsional forces that may develop as the winch cable 34 pulls the distressed vehicle in a direction toward the recovery vehicle 10.

Referring again to FIG. 2, the intermediate members 44a-44d are configured to structurally support the upper member 42 and further configured to support the rotatable swing arm assembly 32. In the illustrated embodiment, the intermediate members 44a-44d are attached to the lower member 40 and the upper member 42 by welding. However, in other embodiments, the intermediate members 44a-44d can be attached to the lower member 40 and the upper member 42 by other structures, mechanisms and devices, such as for example, mechanical fasteners, clips or clamps. In the illustrated embodiment, the intermediate members 44a-44d are formed from 5.0 inch square steel tube having a 7 gauge wall thickness. Alternatively, the intermediate members 44a-44d can be formed from other materials or combinations of materials sufficient for attachment to the lower member 40 and the upper member 42 and sufficient to support the rotatable swing arm assembly 32.

Referring again to FIG. 2, the intermediate members 44a-44d are attached to the lower and upper members 40, 42 such as to form truss-like structures, that is, a structure of connected elements forming triangular units. Without being held to the theory, it is believed the formed trusses facilitate support of the rotatable swing arm assembly 32 from tensional and torsional forces incurred by the rotatable swing arm assembly 32 that may develop as the winch cable 34 pulls the distressed vehicle in a direction toward the recovery vehicle 10. However, it should be appreciated that in other embodiments, the intermediate members 44a-44d can form other structures with the lower and upper members 40, 42 sufficient to support of the rotatable swing arm assembly 32 from tensional and torsional forces incurred by the rotatable swing arm assembly 32.

Referring again to FIG. 2, a first end of a first bolster 46a is connected to the intermediate member 44b. The first bolster 46a extends from the intermediate member 44b at an angle α such that a second end of the first bolster 46a is connected to the chassis 14 a distance from the intermediate member 44b. The first bolster 46a is configured to support of the rotatable swing arm assembly 32 from tensional and torsional forces incurred by the rotatable swing arm assembly 32 that may develop as the winch cable 34 pulls the distressed vehicle in a direction toward the recovery vehicle 10. In the illustrated embodiment, the angle α is in a range of from about 15° to about 30°. However, in other embodiments, the angle α can be less than about 15° or more than about 30°, sufficient to support of the rotatable swing arm assembly 32 from tensional and torsional forces incurred by the rotatable swing arm assembly 32 that may develop as the winch cable 34 pulls the distressed vehicle in a direction toward the recovery vehicle 10.

In a similar manner, a first end of a second bolster 46b is connected to the intermediate member 44c. The second bolster 46b extends from the intermediate member 44c at an angle α such that a second end of the second bolster 46a is connected to the chassis 14 a distance from the intermediate member 44c. The second bolster 46b is configured to support of the rotatable swing arm assembly 32 from tensional and torsional forces incurred by the rotatable swing arm assembly 32 that may develop as the winch cable 34 pulls the distressed vehicle in a direction toward the recovery vehicle 10. In the illustrated embodiment, the angle α is in a range of from about 15° to about 30°. However, in other embodiments, the angle α can be less than about 15° or more than about 30°, sufficient to support of the rotatable swing arm assembly 32 from tensional and torsional forces incurred by the rotatable swing arm assembly 32 that may develop as the winch cable 34 pulls the distressed vehicle in a direction toward the recovery vehicle 10.

In the illustrated embodiment, the bolsters 46a, 46b are formed from 2.0 inch square steel tube having a 0.25 inch wall thickness. Alternatively, the bolsters 46a, 46b can be formed from other materials or combinations of materials sufficient for attachment to the lower member 40 and the upper member 42 and sufficient to support of the rotatable swing arm assembly 32 from tensional and torsional forces incurred by the rotatable swing arm assembly 32 that may develop as the winch cable 34 pulls the distressed vehicle in a direction toward the recovery vehicle 10.

In the embodiment illustrated in FIG. 2, a quantity of two (2) bolsters 46a, 46b are illustrated. It should be appreciated that in other embodiments, more or less than a quantity of two (2) bolsters can be used.

In the embodiment illustrated in FIG. 2, the first bolster 46a is connected to the intermediate member 44b and the second bolster 46b is connected to the intermediate member 44c. Alternatively, the first and second bolsters 46a, 46b can be connected to other intermediate members or the upper member 42, sufficient to support of the rotatable swing arm assembly 32 from tensional and torsional forces incurred by the rotatable swing arm assembly 32 that may develop as the winch cable 34 pulls the distressed vehicle in a direction toward the recovery vehicle 10.

Referring again to FIG. 2, an optional upper assembly 50 extends vertically from the upper member 42. The optional upper assembly 50 is configured as a mount for accessories 52, such as for example, a plurality of flashing and/or strobe lights, sirens, and safety reflectors. In the illustrated embodiment, the optional upper assembly 50 includes a cross member 54 supported by a plurality of support members 56. However, in other embodiments, the upper assembly 50 can be formed from other structures. It should be appreciated that the upper assembly 50 is optional and not required for operation of the directional vehicle recovery unit 30.

Figure 3:
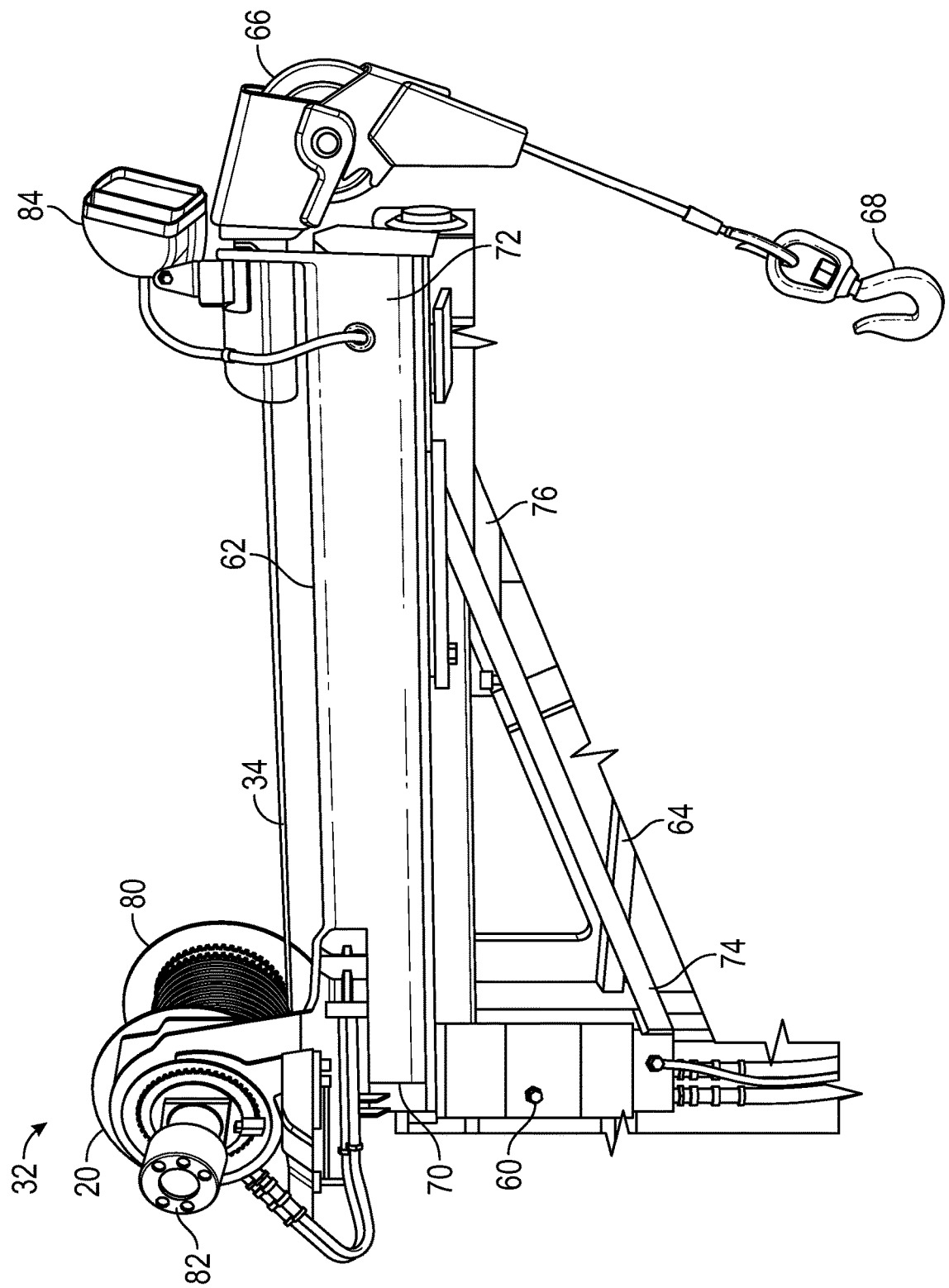
FIG. 3 is a perspective view of a swing arm assembly of the directional vehicle recovery unit of FIG. 1.

Referring now to FIG. 3, the rotatable swing arm assembly 32 is illustrated. The rotatable swing arm assembly 32 includes a bearing structure 60, a swing arm 62, a brace 64, the winch 20, the winch cable 34, a pulley 66 and a hook 68.

The swing arm assembly 32 is configured for rotation about the bearing structure 60 such that in operation, a longitudinal axis of the swing arm 62 is substantially pointed in the direction of the distressed vehicle. The swing arm 62 has a first end 70 positioned atop the bearing structure 60 and extends to an opposing second end 72. The swing arm 62 is configured to support the tensional and torsional forces that may develop as the winch cable 34 pulls the distressed vehicle in a direction toward the recovery vehicle 10. In the illustrated embodiment, the swing arm 62 is formed from 5.0 inch square steel tube having a 7 gauge wall thickness. Alternatively, the swing arm 62 can be formed from other materials or combinations of materials sufficient to support the pulley 66 and support the tensional and torsional forces that may develop as the winch cable 34 pulls the distressed vehicle in a direction toward the recovery vehicle 10.

An axial member (not shown) extends through the bearing structure 60 and connects the first end 70 of the swing arm 62 with a first end 74 of the brace 64. The axial member can have any desired structure, such as the non-limiting example of a structural tube, sufficient to connect the first end 70 of the swing arm 62 with a first end 74 of the brace 64.

Referring again to FIG. 3, the bearing structure 60 can include one or more bearings (not shown), such as for example, axial bearings, thrust bearings or bushings configured to support the weight of the swing arm assembly 32 as the swing arm assembly 32 rotates. The bearings can have any desired form sufficient to support the weight of the swing arm assembly 32 as the swing arm assembly 32 rotates.

Referring again to FIG. 20, the winch 20 is mounted atop the first end 70 of the swing arm 62, such that winch 20 moves with the swing arm 62 as the swing arm 62 rotates about the bearing structure 60. In the illustrated embodiment, the winch 20 includes a spool 80 rotatably driven by a hydraulically actuated motor 82. The spool 80 and the motor 82 cooperate to pull in or let out or otherwise adjust the "tension" of the winch cable 34. While the illustrated embodiment of the winch 20 is described as having the spool 80 and the hydraulically actuated motor 82, it should be appreciated that in other embodiments, the winch 20 can have other structures, mechanisms and devices and can operate in different manners.

Referring again to FIG. 3, as described above the first end 74 of the brace 64 is connected to the axial member extending through the bearing structure 60. The brace 64 extends from the bearing structure 60 such that a second end 76 of the brace 64 is connected to the swing arm 62 are a position between the ends 70, 72 of the swing arm 62. The brace 64 is configured to support the tensional and torsional forces that may develop in the swing arm 62 as the winch cable 34 pulls the distressed vehicle in a direction toward the recovery vehicle 10. In the illustrated embodiment, the brace 64 is formed from 2.0 inch square steel tube having a 0.25 inch wall thickness. Alternatively, the brace 64 can be formed from other materials or combinations of materials sufficient to support the tensional and torsional forces that may develop in the swing arm 62 as the winch cable 34 pulls the distressed vehicle in a direction toward the recovery vehicle 10.

Referring again to FIG. 3, the winch cable 34 is configured to translate the rotation of the spool 80 into a pulling force sufficient to pull a distressed vehicle in a direction toward the recovery vehicle 10. In the illustrated embodiment, the winch cable 34 has the form of a wire rope having a tensile strength of 12,000 pounds. Alternatively, the winch cable 34 can have other forms and other tensile strengths sufficient to translate the rotation of the spool 80 into a pulling force sufficient to pull a distressed vehicle in a direction toward the recovery vehicle 10.

Referring again to FIG. 3, the pulley 66 is supported by the second end 72 of the swing arm 62 and is configured to support movement and change of vertical direction of the winch cable 34. The pulley 66 facilitates the change in vertical direction of the winch cable 34 as the distressed vehicle is pulled closer to the recovery vehicle 10. In the illustrated embodiment, the pulley 66 has an 8.0 inch diameter. However, in other embodiments, the pulley 66 can have other diameters sufficient to movement and change of vertical direction of the winch cable 34.

Referring again to FIG. 3, the hook 68 is connected to an outward end of the winch cable 34 and is configured for attachment to the distressed vehicle. In the illustrated embodiment, the hook 68 has the form of a safety hook equipped with a locking latch. However, other hooks sufficient for connection to the winch cable 34 and attachment to the distressed vehicle can be used.

Referring again to FIG. 3, optionally the swing arm assembly 32 can be equipped with one or more lights 84 configured to illuminate a work area. The lights 84 can have any desired structure and illumination. However, it should be appreciated that the lights 84 are optional and not required for operation of the directional vehicle recovery unit 30.

Figure 4:
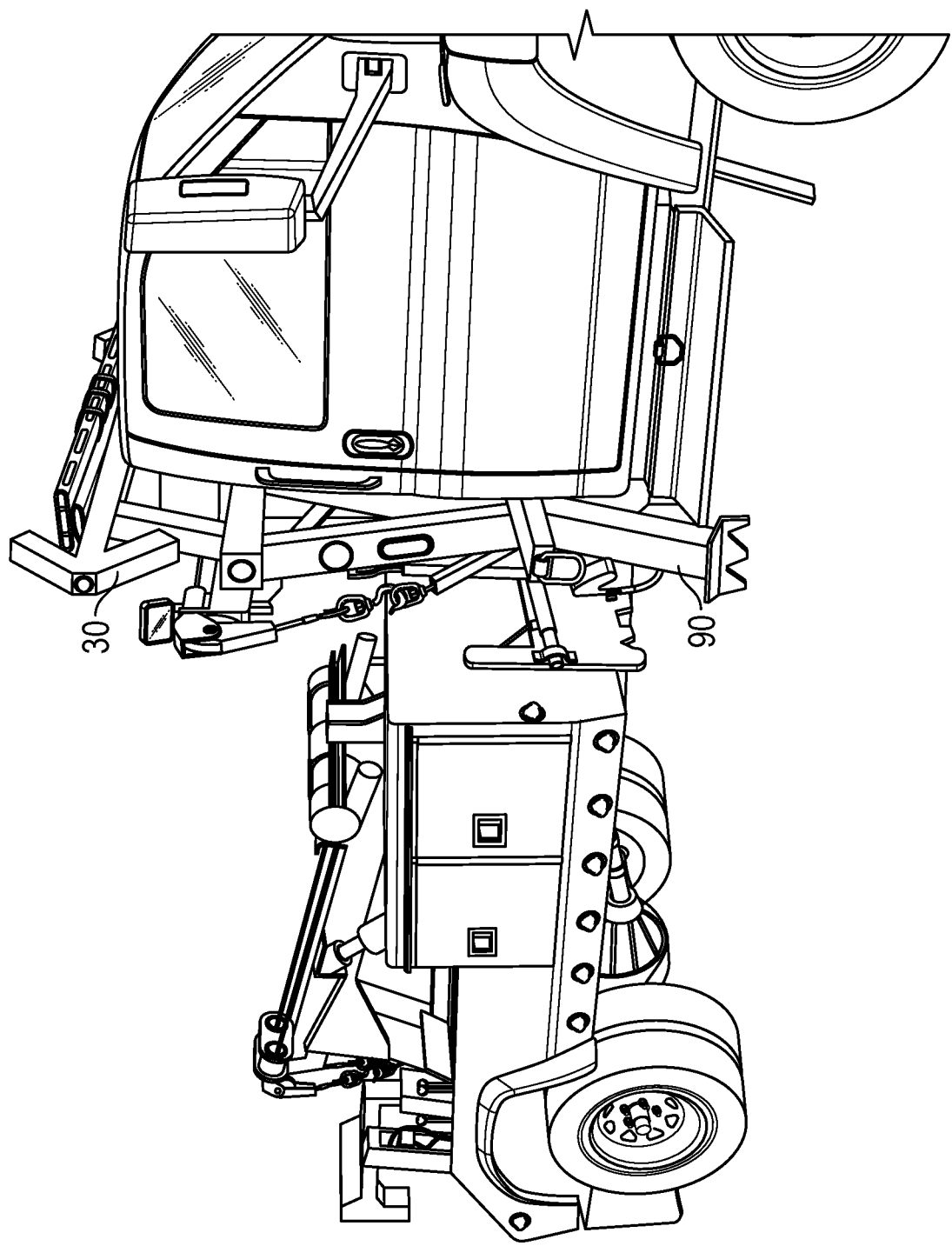
FIG. 4 is a perspective view of a stabilizing structure of the directional vehicle recovery unit of FIG. 1.

Referring now to FIG. 4, the directional vehicle recovery unit 30 can include a plurality of stabilizing structures 90. The stabilizing structures 90 are configured to contact the surface of the ground, thereby bracing the recovery vehicle 10 during a recovery operation. In the illustrated embodiment, the stabilizing structures 90 have the form of telescoping square tubes having a size of 4.5 inches, a 7 gauge wall thickness, and are raised and lowered hydraulically. In other embodiment, the stabilizing structures 90 can have other forms and be raised and lowered in other manners, such as the non-limiting example of by electric motors, sufficient to brace the recovery vehicle 10 during a recovery operation.

Referring again to FIG. 4, the stabilizing structures 90 are attached to one or both sides the lower member 40 of the support framework 36, such as to provide ready access of the stabilizing structures 90 to the surface of the ground. In other embodiments, the stabilizing structures 90 can be attached to other portions of the support framework 36, such as to provide ready access of the stabilizing structures 90 to the surface of the ground.

Figure 5:
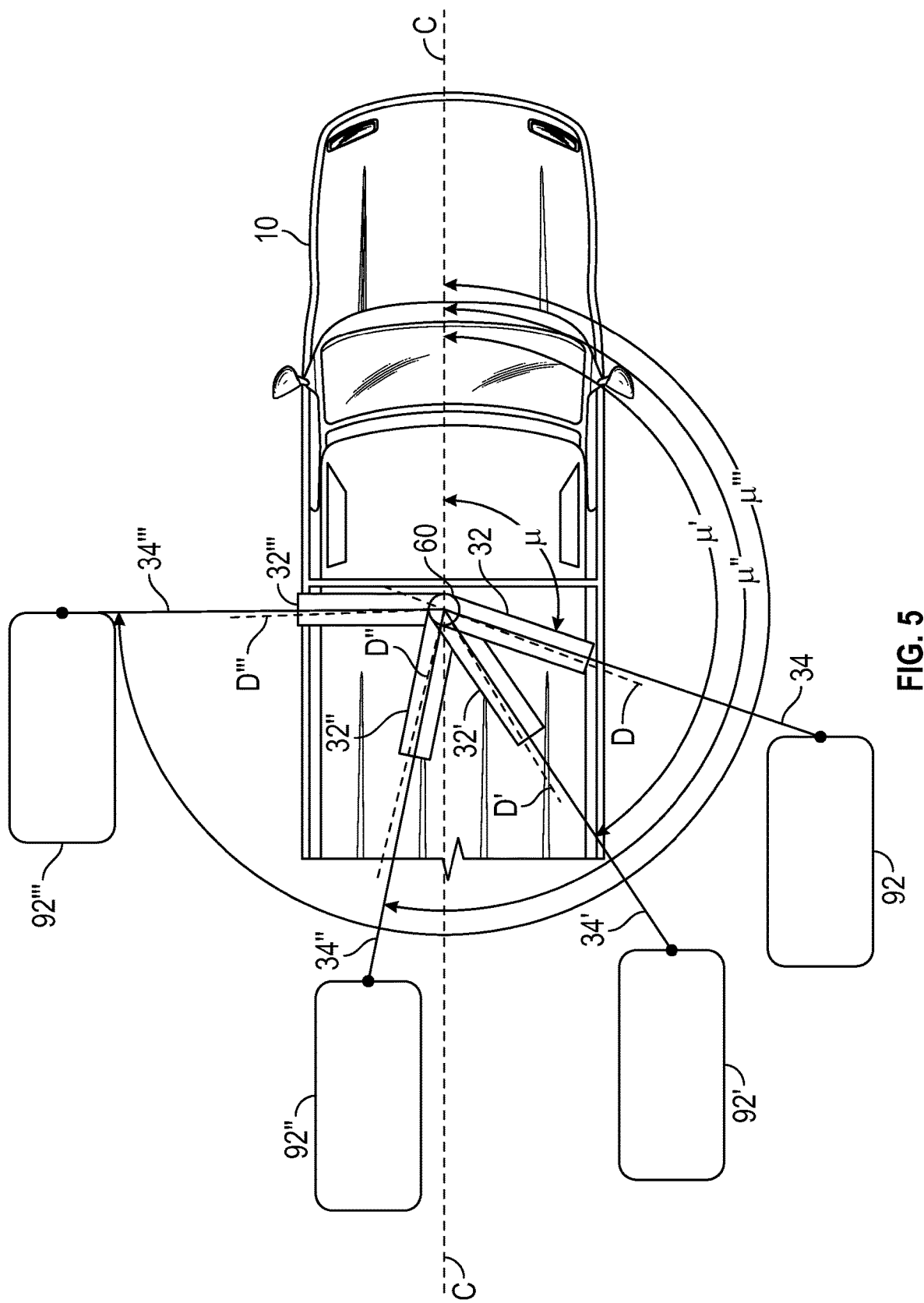
FIG. 5 is a schematic illustration showing the rotation of the directional vehicle recovery unit of FIG. 1.

Referring now to FIG. 5 and as described above, the directional vehicle recovery unit 30 is fitted to a recovery vehicle 10 and includes a rotatable swing arm assembly (shown schematically at 32). The winch 20 is supported by the rotatable swing arm assembly such as to permit a winch cable 34 extending from the winch 20 to attach to a distressed vehicle. The distressed vehicle can be positioned in an area either to a side of the recovery vehicle 10 or in an area off of a rear portion of the recovery vehicle 10. Since the swing arm assembly 32 is rotatable, the swing arm assembly 32 can be positioned at any desired angle relative to the longitudinal axis C-C of the recovery vehicle 10, thereby allowing a longitudinal axis of swing arm assembly 32 to align with an axis formed by the winch cable. In this manner, the rotatable swing arm assembly 32 supports the winch cable 34 along its axis, regardless of the angle formed by the swing arm assembly 32 relative to the longitudinal axis C-C of the recovery vehicle 10.

Referring again to FIG. 5, four different scenarios are presented as non-limiting examples of an angle formed by the longitudinal axis of the swing arm assembly 32. In a first example, a distressed vehicle shown schematically at 92 is positioned to the passenger side of the recovery vehicle 10 and slightly to the rear of the bearing structure 60. To recovery the distressed vehicle 92, the swing arm assembly 32 is rotated until a longitudinal axis D-D of the swing arm assembly 32 aligns in a substantially parallel orientation with the winch cable 34 attached to the distressed vehicle 92. With this orientation, the longitudinal axis D-D of the swing arm assembly 32 forms an angle μ with the longitudinal axis C-C of the recovery vehicle 10. In the first example, the angle μ is in a range of from about 100° to about 120°.

Referring again to FIG. 5 in a second example, a recovery vehicle shown schematically at 92' is positioned to the passenger side of the recovery vehicle 10 and to the rear of the bearing structure 60. To recovery the distressed vehicle 92', the swing arm assembly 32' is rotated until a longitudinal axis D'-D' of the swing arm assembly 32' aligns in a substantially parallel orientation with the winch cable 34' attached to the distressed vehicle 92'. With this orientation, the longitudinal axis D'-D' of the swing arm assembly 32' forms an angle μ' with the longitudinal axis C-C of the recovery vehicle 10. In the second example, the angle μ' is in a range of from about 130° to about 150°.

Referring again to FIG. 5 in a third example, a distressed vehicle is shown schematically at 92" is positioned to the passenger side of the recovery vehicle 10 and to the rear of the bearing structure 60. To recovery the distressed vehicle 92", the swing arm assembly 32" is rotated until a longitudinal axis D"-D" of the swing arm assembly 32" aligns in a substantially parallel orientation with the winch cable 34" attached to the distressed vehicle 92". With this orientation, the longitudinal axis D"-D" of the swing arm assembly 32" forms an angle μ" with the longitudinal axis C-C of the recovery vehicle 10. In the third example, the angle μ" is in a range of from about 180° to about 200°.

Referring again to FIG. 5 in a final example, a recovery vehicle is shown schematically at 92''' is positioned to the passenger side of the recovery vehicle 10 and to the rear of the bearing structure 60. To recovery the distressed vehicle 92''', the swing arm assembly 32''' is rotated until a longitudinal axis D'''-D''' of the swing arm assembly 32''' aligns in a substantially parallel orientation with the winch cable 34''' attached to the distressed vehicle 92'''. With this orientation, the longitudinal axis D'''-D''' of the swing arm assembly 32''' forms an angle μ''' with the longitudinal axis C-C of the recovery vehicle 10. In the final example, the angle μ''' is in a range of from about 260° to about 270°.

As can be seen from the examples illustrated in FIG. 5, the swing arm assembly 32 can be rotated such as that the longitudinal axis of the swing arm assembly can form an angle with the longitudinal axis of the recovery vehicle in a range of from about 90° to about 270°. Advantageously, the rotation of the swing arm assembly 32 allows the swing arm assembly to support a winch cable, along the longitudinal axis of the swing arm assembly, as the distressed vehicle is pulled toward the recovery vehicle. The rotation of the swing arm assembly eliminates the need to reposition the recovery vehicle for proper alignment of the winch cable.

In certain embodiment, the rotation of the swing arm assembly can be accomplished with hydraulic actuators. However, in other embodiments, other mechanisms and devices can be used to rotate the swing arm assembly. In still other embodiments, it is within the contemplation of the directional vehicle recovery unit that rotation of the swing arm assembly can be actuated from distances remote to the recovery vehicle with the use of remote control devices.

The principle and mode of operation of the directional vehicle recovery unit have been described in certain embodiments. However, it should be noted that the directional vehicle recovery unit may be practiced otherwise than as specifically illustrated and described without departing from its scope.

What is claimed is:

1. A directional vehicle recovery unit configured for recovery of a distressed vehicle spaced apart from a recovery vehicle, the directional vehicle recovery unit comprising:
   a support framework attached to the recovery vehicle;
   a swing arm assembly attached to the support framework, the swing arm assembly including a swing arm, the swing arm having a upper surface and configured to support a winch cable in a location external to the swing arm and above the upper surface of the swing arm, the swing arm having a longitudinal axis; and
   a winch having a bottom surface, the bottom surface of the winch seated on the upper surface of the swing arm, the winch configured to adjust tension in the winch cable, the winch having a winch spool, the winch spool having a longitudinal axis, the longitudinal axis of the winch spool arranged in a transverse orientation with the longitudinal axis of the swing arm;
   wherein the swing arm assembly is rotates in a horizontal plane such that with a winch cable attached to the distressed vehicle, a longitudinal axis of the swing arm assembly is substantially parallel with an axis formed by the winch cable.

2. The directional vehicle recovery unit of claim 1, wherein the support framework includes upper and lower members spaced apart by intermediate members.

3. The directional vehicle recovery unit of claim 2, wherein the upper, lower and intermediate members cooperate to form truss-like structures.

4. The directional vehicle recovery unit of claim 1, wherein the support framework includes a plurality of bolsters attached to a recovery vehicle chassis and configured to support the rotatable swing arm assembly from tensional and torsional forces incurred by the rotatable swing arm assembly during recovery of the distressed vehicle.

5. The directional vehicle recovery unit of claim 1, wherein the bolsters form an angle with the support framework in a range of from about 15° to about 30°.

6. The directional vehicle recovery unit of claim 1, wherein the swing arm assembly includes a bearing structure configured to support the swing arm assembly as it rotates.

7. The directional vehicle recovery unit of claim 1, wherein the swing arm assembly is configured to rotate such as that the longitudinal axis of the swing arm assembly can form an angle with a longitudinal axis of the recovery vehicle in a range of from about 90° to about 270°.

8. The directional vehicle recovery unit of claim 1, wherein the swing arm assembly includes a swing arm configured for rotation about a bearing structure.

9. The directional vehicle recovery unit of claim 1, wherein rotation of the swing arm assembly is hydraulically actuated.

10. A method of using a directional vehicle recovery unit for recovery of a distressed vehicle spaced apart from a recovery vehicle, the method comprising:
    extending a winch cable from a winch mounted to an upper surface of a swing arm of a swing arm assembly to the distressed vehicle, the swing arm assembly having a longitudinal axis, the winch configured to adjust tension in the winch cable and having a winch spool, the winch spool having a longitudinal axis, the longitudinal axis of the winch spool arranged in a transverse orientation with the longitudinal axis of the swing arm assembly, the swing arm assembly being attached to the recovery vehicle, wherein the winch cable is located external to the swing arm and above the upper surface of the swing arm;

rotating the swing arm assembly such that a longitudinal axis of the swing arm assembly is substantially parallel with an axis formed by the winch cable; and pulling the distressed vehicle in a direction toward the recovery vehicle.

11. The method of claim 10, wherein the swing arm assembly is attached to a support framework that includes upper and lower members spaced apart by intermediate members.

12. The method of claim 11, wherein the upper, lower and intermediate members cooperate to form truss-like structures.

13. The method of claim 11, wherein the support framework includes a plurality of bolsters attached to a recovery vehicle chassis and configured to support the rotatable swing arm assembly from tensional and torsional forces incurred by the rotatable swing arm assembly during recovery of the distressed vehicle.

14. The method of claim 13, wherein the bolsters form an angle with the support framework in a range of from about 15° to about 30°.

15. The method of claim 10, wherein the swing arm assembly includes a bearing structure configured to support the swing arm assembly as it rotates.

16. The method of claim 10, wherein the swing arm assembly is configured to rotate such as that the longitudinal axis of the swing arm assembly can form an angle with a longitudinal axis of the recovery vehicle in a range of from about 90° to about 270°.

17. The method of claim 10, wherein the swing arm assembly includes a swing arm configured for rotation about a bearing structure.

18. The method of claim 10, including the step of hydraulically actuating rotation of the swing arm assembly.

* * * * *